(12) United States Patent
Morgis et al.

(10) Patent No.: US 11,872,419 B1
(45) Date of Patent: Jan. 16, 2024

(54) WEBBING FOR FALL PROTECTION DEVICE

(71) Applicant: OTEX Specialty Narrow Fabrics, Inc., Bernardsville, NJ (US)

(72) Inventors: Mark M. Morgis, Mountain Top, PA (US); Kevin W. Raup, Milton, PA (US)

(73) Assignee: OTEX SPECIALTY NARROW FABRICS, INC., Bernardsville, NJ (US)

( * ) Notice: Subject to any disclaimer, the term of this patent is extended or adjusted under 35 U.S.C. 154(b) by 217 days.

(21) Appl. No.: 16/427,717

(22) Filed: May 31, 2019

Related U.S. Application Data

(60) Provisional application No. 62/679,127, filed on Jun. 1, 2018.

(51) Int. Cl.
| | |
|---|---|
| A62B 35/00 | (2006.01) |
| B32B 5/26 | (2006.01) |
| B32B 5/10 | (2006.01) |
| B32B 5/02 | (2006.01) |
| D03D 1/00 | (2006.01) |
| D03D 15/292 | (2021.01) |

(Continued)

(52) U.S. Cl.
CPC .......... *A62B 35/0075* (2013.01); *B32B 5/024* (2013.01); *B32B 5/10* (2013.01); *B32B 5/26* (2013.01); *D03D 1/0005* (2013.01); *D03D 11/00* (2013.01); *D03D 15/283* (2021.01); *D03D 15/292* (2021.01); *D03D 15/593* (2021.01); *D03D 25/005* (2013.01); *B32B 2262/0253* (2013.01); *B32B 2571/00* (2013.01)

(58) Field of Classification Search
CPC ............. A62B 35/0075; D03D 25/005; D03D 15/292; D03D 11/00; D03D 15/283; D03D 15/593; D03D 1/0005; B32B 5/024; B32B 5/26; B32B 5/10; B32B 2262/0253; B32B 2571/00; Y10T 428/247; Y10T 442/317–3211
See application file for complete search history.

(56) References Cited

U.S. PATENT DOCUMENTS

| | | | | |
|---|---|---|---|---|
| 1,734,165 | A | * | 11/1929 | French .................... D03D 1/00 D11/221 |
| 4,856,837 | A | * | 8/1989 | Hammersla, Jr. ........ B66C 1/18 294/74 |

(Continued)

FOREIGN PATENT DOCUMENTS

EP          1 134 313 A2     9/2001

OTHER PUBLICATIONS

Sturges Manufacturing Co., Inc., Arc Flash SRL Webbing, Nov. 22, 2019, https://www.sturgesmfgco.com/webbing/fall-protection/arc-flash-webbing/arc-flash-srl-webbing/.

(Continued)

*Primary Examiner* — Elizabeth M Imani
(74) *Attorney, Agent, or Firm* — Lowenstein Sandler LLP

(57) ABSTRACT

A webbing for use in a fall protection device, such as a self-retracting lifeline having leading edge capabilities, is provided having a double cloth construction with the exterior of the webbing constructed of woven, ultra-high molecular weight polyethylene yarns and having stuffer yarns positioned in the interior of the fabric, wherein the stuffer yarns are made of high-tenacity fibers, such as aramid fibers.

20 Claims, 2 Drawing Sheets

(51) Int. Cl.
*D03D 11/00* (2006.01)
*D03D 25/00* (2006.01)
*D03D 15/593* (2021.01)
*D03D 15/283* (2021.01)

(56) References Cited

U.S. PATENT DOCUMENTS

| | | | |
|---|---|---|---|
| 5,677,056 | A | 10/1997 | Golz |
| 6,840,066 | B2 | 1/2005 | Dickerson |
| 7,815,013 | B2 | 10/2010 | Griffith |
| 7,866,245 | B2 | 1/2011 | Kempf et al. |
| 7,870,934 | B2 | 1/2011 | Ecker |
| 8,356,691 | B2 * | 1/2013 | Griffith ................. A62B 35/04 |
| | | | 182/3 |
| 8,701,716 | B2 * | 4/2014 | Kashihara ............ D03D 13/004 |
| | | | 139/384 R |
| 9,199,103 | B2 | 12/2015 | Hetrich et al. |
| 9,238,156 | B2 | 1/2016 | Apel et al. |
| 9,719,196 | B2 | 8/2017 | Salama et al. |
| 2002/0124904 | A1 * | 9/2002 | Howland ................. B60C 9/18 |
| | | | 139/420 R |
| 2006/0027277 | A1 * | 2/2006 | Jennings ................ D03D 11/00 |
| | | | 139/408 |
| 2008/0179136 | A1 | 7/2008 | Griffith |
| 2010/0101833 | A1 | 4/2010 | Zachariades et al. |
| 2012/0205478 | A1 | 8/2012 | Balquist et al. |
| 2014/0113519 | A1 * | 4/2014 | Golz ........................ D03D 3/02 |
| | | | 442/190 |
| 2015/0013079 | A1 | 1/2015 | Golz |
| 2016/0220857 | A1 | 8/2016 | Rappoport et al. |

OTHER PUBLICATIONS

Sturges Manufacturing Co., Inc., Leading Edge Webbing, Oct. 25, 2019, https://www.sturgesmfgco.com/webbing/fall-protection/leading-edge-webbing/.

Otex Specialty Narrow Fabrics, Aerospace Webbing, Ropes & Tapes UL & NFPA Compliant, Oct. 25, 2019, osnf.com/aerospece-webbing.

Islam, Shariful, et al., The Construction Principle of Double Cloth, Trends Textile Eng Fashion Technol., Feb. 8, 2018, pp. 1-10, vol. 1, Issue 2, Crimson Publishers, Bangladesh.

* cited by examiner

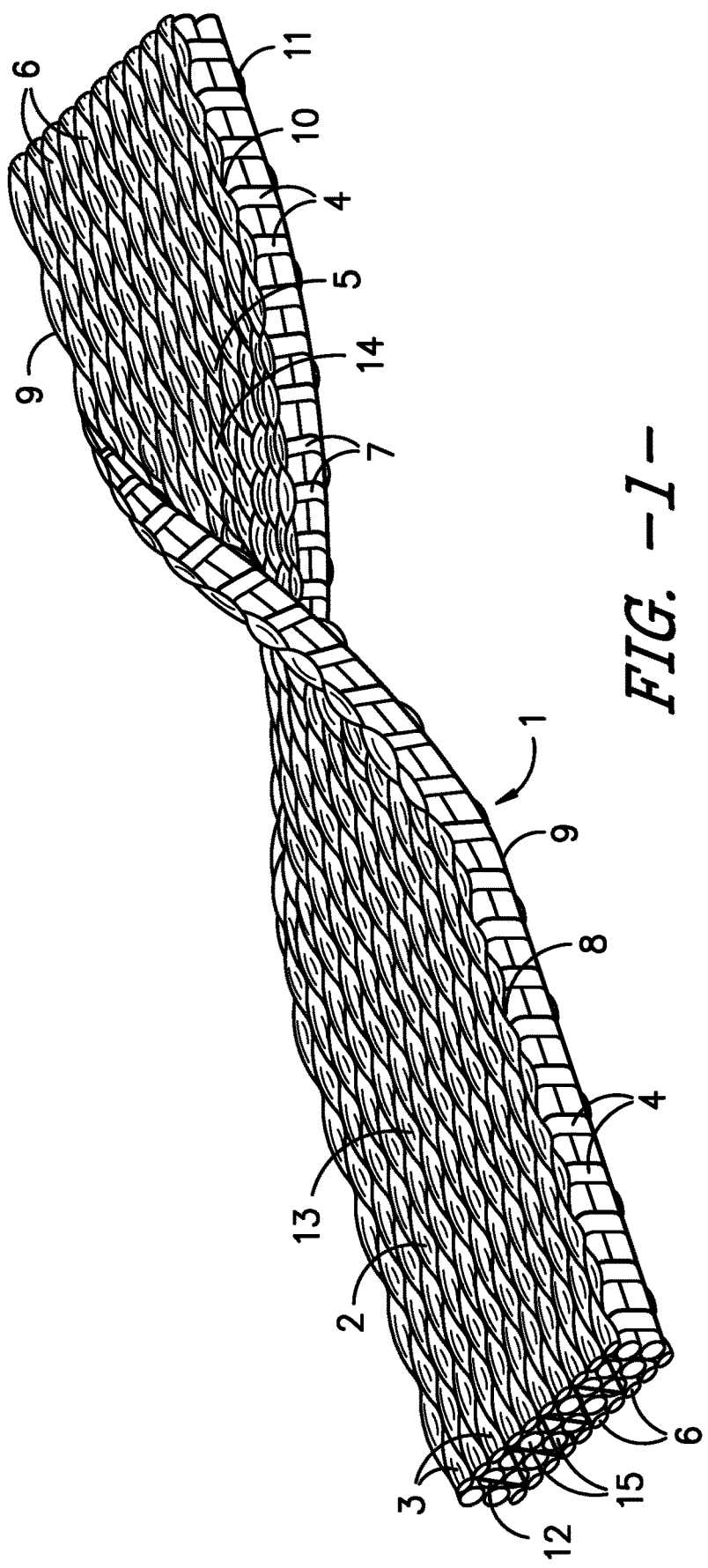
FIG. -1-

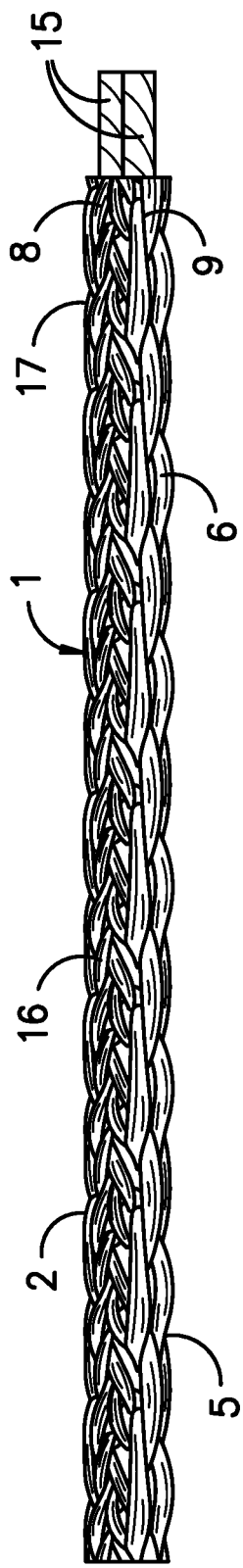
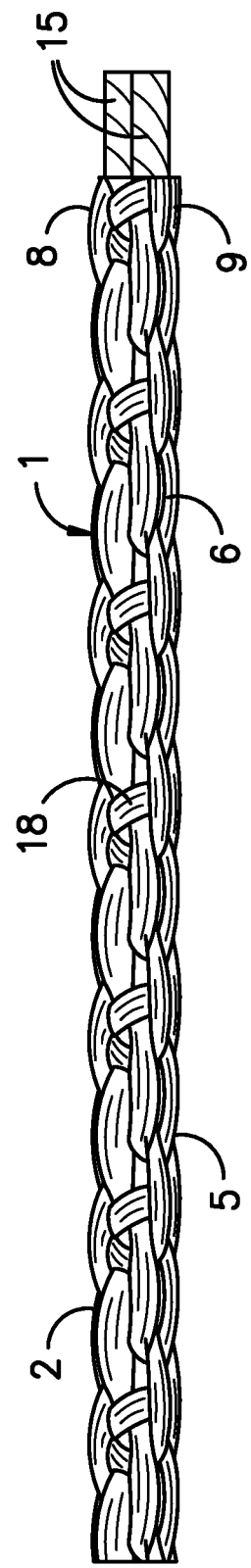

WEBBING FOR FALL PROTECTION DEVICE

This invention relates to narrow textile fabrics in the form of webbing for use in a fall protection device, in particular, for leading edge applications.

BACKGROUND OF THE INVENTION

Fall protection systems typically incorporate (i) a harness worn by a worker; (ii) a self-retracting lifeline; and (iii) an anchor connected to the free end of the lifeline. If a worker falls, a locking mechanism in the housing prevents the pay out of the lifeline, thereby arresting the fall. A leading edge application is a working surface with a sharp or abrasive edge, such as a steel girder or concrete decking, which places additional stress on the lifeline, should a worker fall.

Various fall protection systems have been developed, which incorporate a textile made of high modulus synthetic fibers as the lifeline. Ecker—U.S. Pat. No. 7,870,934 B2 discloses a self-retracting lifeline and braking system, which may incorporate a nylon webbing. Zachariades et al.—Patent Application Publication No. US 2010/0101833 A1 disclose a braid construction for a rope having a braided inner layer of an aromatic polyamide, such as Kevlar, and a braided outer layer of ultra-high molecular weight polyethylene tape. Balquist et al.—Patent Application Publication No. US 2012/0205478 A1 disclose a retracting lifeline system incorporating a webbing having an interior of a high strength or high tenacity fiber selected from aramid fibers and ultra-high molecular weight polyethylene, and an abrasion resistant exterior selected from spun yarns, such as spun polyester fibers. Salama et al.—U.S. Pat. No. 9,719,196 B2 disclose various high tensile strength-to-weight ratio fibers useful for interlocking weave performance fabrics.

Rappoport et al.—Patent Application Publication US 2016/0220857 A1 disclose a lifeline for a fall protection system incorporating a webbing made from high tenacity fibers. The threads forming the edge of the webbing are characterized by outer edge threads and inner edge threads. The outer edge threads and inner edge threads are provided in contrasting colors. When the outer edge threads are worn, the inner edge threads are exposed, thereby indicating that the lifeline may need to be replaced.

Despite the developments in the field of fall protection, there remains a need for a lifeline for use in a fall protection system that is abrasion and cut resistant, high strength, able to absorb the shock of a person falling, flexible, lightweight, and compact.

SUMMARY OF THE INVENTION

A webbing is provided having a double cloth woven construction enveloping a plurality of stuffer yarns. The webbing has two exterior sides and two edges. Each of the sides is comprised of a plurality of warp yarns, also referred to a ends, interlaced crosswise multiple times along the length of the webbing with a weft yarn, also referred to as a filling yarn. Each insertion of the weft yarn through the warp yarns is referred to as a pick. The warp yarns are multifilament yarns comprised of ultra-high molecular weight polyethylene fibers. The weft yarn is a multifilament yarn comprised of high-tenacity fibers, which may be ultra-high molecular weight polyethylene or a different high-tenacity fiber. The warp and weft yarns may be interlaced to create a plain, twill or satin weave, or a combination thereof.

The first side and second side are joined together by binder yarns extending between the first side and the second side of the webbing, thereby joining the sides together. By way of example, the double construction may be self-stitched, center stitched, or stitched by yarn interchange. The binder may be a multifilament yarn comprised of high-tenacity fibers.

A plurality of stuffer yarns are sandwiched between the first side and the second side of the double cloth and extend in the warp direction. The stuffer yarns are multifilament yarns comprised of high-tenacity fibers, which provide strength and resilience to the webbing. The stuffer yarns are held in place by the binder yarns, and in certain embodiments, by a continuous weft yarn encircling the first side and second side of the double cloth in a spiral, thereby joining their edges together. A catch cord may be employed along the edges of the webbing to lock the weft yarns in place and secure the stuffer yarns within the interior of the webbing.

A feature of the present invention is the concentration of the warp yarns at the exterior or face of each side of the webbing, that is, the warp yarns are predominantly exposed at the face of each side of the webbing, relative to the weft yarn. Accordingly, the ultra-high molecular weight polyethylene warp yarns, which have superior abrasion resistance and cut resistance, are exposed to a leading edge in a fall protection application. Furthermore, in the case of a fall, the webbing will be dragged lengthwise along a leading edge, and it is believed to be advantageous for the yarns running lengthwise in the webbing, that is, the warp yarns, to engage the leading edge, rather than the weft yarn, to minimize snagging.

The objectives of the invention may be accomplished by one or more of the following constructions, or combinations thereof. The warp yarns may be provided in significantly higher concentration than the weft yarn. By way of example, the ratio of the ends per inch of warp yarns comprised of ultra-high molecular weight polyethylene to the picks per inch in the woven sides of the webbing may be 2:1 or greater, particularly, 3:1 or greater, more particularly 4:1 or greater. A single weft yarn may be employed, whereby the weft yarn is interlaced with the warp yarns in the first side of the webbing, next the weft yarn encircles a first edge of the webbing and is interlaced with the warp yarns in the second side of the webbing, and then the weft yarn encircles the second edge of the webbing and is again interlaced with the warp yarns in the first side of the webbing at a farther distance along the length of the webbing, thereby creating a continuous spiral. It can be understood that by controlling the tension of the weft yarn, the warp yarns are drawn together, forcing the exposure of the warp yarns on the face of each side of the webbing. An additional technique for improving the performance of the webbing in leading edge, fall protection applications is to minimize the picks per inch of the weft yarn to 24 ppi or less, in particular, from 6 to 18 ppi, more particularly, from 8 to 16 ppi, per side.

The webbing of the present invention has application is fall protection devices, especially due to the combination of the webbing's abrasion and cut resistance, high tensile strength, flexibility and compact volume. The webbing may also be used in other applications where a high tensile strength webbing is desirable, such as towing, climbing, load securing, passenger restraint in vehicles, military apparel, furniture, aerospace, first responder equipment and apparel, medical equipment, tactical gear and the like.

BRIEF DESCRIPTION OF THE DRAWINGS

FIG. 1 is a perspective view of the webbing with a ½ twist to show both sides.

FIG. 2 is a side view of the webbing showing the catch cord stitched into the side of the webbing.

FIG. 3 is a side view of the webbing showing an indicator yarn stitched into the side of the webbing.

The drawings are provided to illustrate the arrangement of the various yarns that make up the construction of the webbing of the present invention, but are not intended to show the precise number of yarns.

DETAILED DESCRIPTION OF THE INVENTION

Without limiting the scope of the invention, the preferred embodiments and features are hereinafter set forth. All of the United States patents and published patent applications cited in the specification are hereby incorporated by reference. Unless otherwise indicated, concentrations are by weight and molecular weight is based on weight average molecular weight. The term "polymer" as used in the present application denotes a material having a weight average molecular weight ($M_w$) of at least 5,000. The term "copolymer" is used in its broad sense to include polymers containing two or more different monomer units, such as terpolymers, and unless otherwise indicated, includes random, block, statistical, copolymers. The term "yarn" includes (i) monofilament; (ii) a plurality of continuous filaments laid together, with or without twist; and (iii) staple fibers twisted together. The term "multifilament yarn" is used to identify a yarn having a plurality of continuous filaments laid together, with or without twist. Yarns may be in the form of individual strands, multiple strands plied together, or multiple plied strands twisted together to form cord.

Referring to FIG. 1, webbing 1 is a double cloth construction. Webbing 1 has side 2 with warp yarns 3 and weft yarns 4, woven together. Webbing 1 is shown with a ½ twist in FIG. 1 to illustrate side 5, opposite from side 2. In the embodiment shown, weft yarn 4 from side 2 wraps around edge 8 of side 2 and edge 9 of side 5, before being inserted through warp yarns 6 of side 5. Next, weft yarn 4 emerges from edge 10 of side 5 and wraps around edge 11 of side 2. Thus, weft yarn 4 continuously wraps webbing 1 in a spiral to join the edges of side 2 and side 5 together.

It can be understood that instead of continuously wrapping weft yarns 4 around edges 8-11, weft yarn 4 may be interlaced with warp yarns 3 of side 2 and weft yarns 7 may be interlaced with warp yarns 6 of side 5, and for example, locked in place by a catch cord. Accordingly, as used herein, the term "weft yarn" refers to either a set of yarns that interlace with the warp yarns of a single side, or a single yarn that interlaces with the warp yarns on one side of the webbing and is wrapped around the edges to interlace with the warp yarns on a second side of the webbing, etc.

Warp yarns 3 and warp yarns 6 are multifilament yarns comprised of ultra-high molecular weight polyethylene (UHMWPE) fibers, also known as high-modulus polyethylene (HMPE) fibers. The UHMWPE may have a molecular weight of 3 million or greater, and is marketed under the trademarks Dyneema® and Spectra®. By way of example, the warp yarns may range in denier from 1200 d to 2000 d, with a filament count of from 500 to 1500. In the example illustrated in FIG. 1, all of warp yarns 3 and 6 may be comprised of UHMWPE. It can be understood that the invention may be practiced with a plurality of the warp yarns being comprised of UHMWPE and other warp yarns being comprised of a different material. In certain embodiments, 50% by weight of the warp yarns are UHMWPE, in particular 66% by weight of the warp yarns are UHMWPE, and more particularly, 75% by weight of the warp yarns forming woven sides 2 and 5 are UHMWPE.

Weft yarns 4 (and 7 when applicable) may be comprised of multifilament, ultra-high molecular weight polyethylene fibers. Alternatively, weft yarns 4 may be comprised of high-tenacity fibers other than UHMWPE, for example, a multifilament, high-tenacity yarn.

The relative amount of warp yarns comprised of UHMWPE to weft yarns in each of the woven sides of the webbing may be expressed as a weight ratio. Accordingly, the weight of the warp yarns comprised of UHMWPE to the weight of weft yarns may be 2:1 or greater, in particular 3:1 or greater or even 3.5:1 or greater.

Side 2 and side 5 are joined together by binder yarns 12, extending between the two sides of webbing 1, thereby joining the two sides together, as shown in FIG. 1. By way of example, the double construction may be self-stitched, center stitched, or stitched by yarn interchange. Binder yarns 12 may be comprised of multifilament, ultra-high molecular weight polyethylene fiber, or binder yarns 12 may be comprised of yarns of high-tenacity fibers other than UHMWPE.

Side 2 and side 5 may be a plain, twill or satin weave. For example, face 13 of side 2 may be a 1×1 or 2×2 plain weave or a warp face twill weave, such as a 2/1, 3/1 or 4/1 twill weave. Face 14 of side 5 may be the same weave as side 2 or different. By way of example, the weave construction of each of sides 2 and 5 may be the same or different and range from 25 to 125 ends per inch and from 5 to 25 picks per inch, in particular from 40 to 100 ends per inch and from 6 to 18 picks per inch. In order to maximize the benefits of the UHMWPE warp yarns, especially in fall protection applications, side 2 and side 5 may be constructed to increase the exposure of warp yarns 3 and warp yarns 6, respectively, relative to the weft yarns. In order to increase the number of warp yarns woven into each side of webbing 1, the warp yarns may be woven in pairs, or as plies of two or more yarns, or as cords of two or more plies.

Stuffer yarns 15 are positioned between side 2 and side 5 of webbing 1. Stuffer yarns 15 are multifilament yarns comprised of high-tenacity fibers. The term "high-tenacity" fibers is intended to include UHMWPE fibers, aramid fibers, such as para-aramid, for example Kevlar®, meta-aramid, for example Nomex®, liquid crystal copolyester fibers, such as aromatic polyesters, for example Vectran®, poly(p-phenylene-2,6-benzobisoxazole), such as Zylon®, and other fibers having a tensile strength of 2.0 GPa or greater, in particular 2.5 GPa or greater, more particularly 3.0 GPa or greater, as well as combinations thereof. In one embodiment of the invention, stuffer yarns 15 comprise a high-tenacity fiber other than UHMWPE, in particular, a para-aramid fiber, such as Kevlar®.

Stuffer yarns 15 may range in denier from 800 d to 2000 d, with a filament count of from 500 to 1500. The ends per inch of stuffer yarns may range from 100 to 250. In one embodiment of the invention, the stuffer yarns are provided as a cord, that is, the stuffer yarns are plied together and the plied yarns are twisted into a cord, to improve strength and stability and to facilitate weaving. By way of example, the stuffer yarns may be used as 3×4 cords, that is, three single yarns are plied together to create a 3-ply yarn and four 3-ply yarns axe twisted together to create a cord. By way of further example, 10 to 20 3×4 cords, representing 120 to 240 single yarns ends may be used.

The ratio of the combined weight of side 2 and side 5 to the weight of stuffer yarns 15 may range from 1:3 to 3:1, in particular, from 1:2 to 2:1, and more particularly from 1:1.5 to 1.5:1.

In another embodiment of the invention, one, two, three, four or more metal cables may be included with the stuffer yarns, that is, positioned between side 2 and side 5 of webbing 1, parallel to the stuffer yarns and running the length of the webbing. The metal cables may be steel cables, such as stainless steel or galvanized steel. The metal cables may improve the abrasion resistance of the webbing.

Webbing made according to teachings herein may have a tensile strength of 6,000 lbs. or greater per one inch width of webbing, as measured by ASTM D6775-13(2017).

Referring to FIG. 2, edges 8 and 9 and edges 10 and 11 may be provided with catch cord 16 and catch cord 17, respectively, to prevent webbing 1 from unraveling. Examples of the use of a catch cord may be found in U.S. Pat. No. 5,677,056.

Other fibers or yarns may be incorporated in webbing 1 for identification or to detect wear, as is known in the art, and illustrated by indicator yarn 18 in FIG. 3.

Example 1

A double cloth, plain weave webbing was produced on a needle loom. Each side of the webbing was constructed of 48 ends of 1600 d, 1000 filament ultra-high molecular weight polyethylene yarns and 24 ends of 1000 d, 192 filament polyester yarns along the edges of the webbing, and 12±2 ppi of 1600 d, 1000 filament ultra-high molecular weight polyethylene yarns. The stuffer yarns were 1500 d, 3×4 Kevlar® cord, and 14 cords (168 yarns) were positioned between the front and back sides of the webbing. Binder yarns of 1600 d, 1000 filament ultra-high molecular weight polyethylene yarn binder were woven between the front and back to secure the sides together. A polyester catch cord (1000 d/192/1.5 z) was used to bind the edges of the webbing.

The webbing had a width of approximately 1.0 inches, a thickness of approximately 0.14 inches and a weight of approximately 58 g/linear yard. The tensile strength of the webbing was approximately 8,000 lbs.

Self-Retracting Lifeline

The webbing of the present invention is particularly useful as the lifeline component in a self-retracting lifeline. Typically, a self-retracting lifeline includes a housing having a rotatable drum mounted on a shaft within the housing. The lifeline is wound around the drum. A snap hook at the free end of the lifeline is anchored to a stationary object, when a worker is operating at a potentially dangerous height. When the lifeline is paid out slowly, a spring mechanism within the housing maintains tension on the lifeline, to remove slack. If, however, the worker falls, a locking engages to prevent the lifeline from paying out, thereby arresting the fall. The locking mechanism may also incorporate a braking assembly, to prevent injury caused by an abrupt stop of downward motion, as disclosed in U.S. Pat. No. 9,199,103 B2.

The webbing of the present invention is designed for use in self-retracting lifelines that meet ANSI Standard Z359.14. Furthermore, because of the abrasion resistance and cut resistance of the outside of the webbing, the webbing is suitable for use in self-retracting lifelines having leading edge capabilities, referred to as SRL-LE devices.

Accordingly, the present invention includes a self-retracting lifeline incorporating the webbing disclosed herein, in particular, a self-retracting lifeline that meets or exceeds ANSI Standard Z359.14 and standards for self-retracting lifelines having leading edge capabilities.

There, of course, many alternative embodiments and modifications of the invention, which are intended to be included in the following claims.

What is claimed is:

1. A self-retracting lifeline having leading edge capabilities, the self-retracting lifeline comprising:
   a webbing comprising:
   (a) a double cloth construction having (i) a first side having a plurality of warp yarns and weft yarns woven together, wherein the warp yarns are multifilament yarns comprised of ultra-high molecular weight polyethylene fibers; (ii) a second side having a plurality of warp yarns and weft yarns woven together, wherein the warp yarns are multifilament yarns comprised of ultra-high molecular weight polyethylene fibers; and (iii) a plurality of binder yarns extending between the first side and second side, whereby the binder yarns joins the first and second side together, wherein the first side of the double cloth has a face and the warp yarns of first side are predominantly exposed on the face relative to the weft yarns, and wherein the second side of the double cloth has a face and the warp yarns of the second side are predominantly exposed on the face relative to the weft yarns; and
   (b) a plurality of stuffer yarns positioned between the first side and second side of the double cloth and extending in the warp direction, wherein the stuffer yarns are cords consisting of para-aramid fibers having a tensile strength of 2.0 GPa or greater, wherein multiple stuffer yarns are formed into plied yarns, and multiple plied yarns are twisted together to form the cords;
   wherein the self-retracting lifeline meets or exceeds ANSI Standard Z359.14.

2. The self-retracting lifeline of claim 1, wherein the weft yarns in the first side and second side are comprised of multifilament ultra-high molecular weight polyethylene fibers.

3. The self-retracting lifeline of claim 2, wherein the first side has a first edge and a second edge and the second side has first edge and a second edge, and the weft yarns are continuously wrapped from the first side to the second side, thereby joining the (i) first edge of the first side to the first edge of the second side, and (ii) the second edge of the first side to the second edge of the second side.

4. The self-retracting lifeline of claim 1, wherein the first side and the second side are plain weaves, and the ratio of ends per inch of warp yarns comprised of UHMWPE to picks per inch in each of the first side and second side of the webbing is 3:1 or greater.

5. The self-retracting lifeline of claim 1, wherein the ratio of ends per inch of warp yarns comprised of UHMWPE to picks per inch in each of the first side and second side of the webbing is 4:1 or greater.

6. The self-retracting lifeline of claim 1, wherein three stuffer yarns are plied together to create a 3-ply yarn, and four of the 3-ply yarns are twisted together to form the cord.

7. The self-retracting lifeline of claim 1, wherein the webbing is characterized by a width, and the webbing has tensile strength of 6,000 lbs. or greater per inch of width.

8. The self-retracting lifeline of claim 1, wherein the warp yarns in the first side and second side have a denier of from 1200 d to 2000 d, and the first side and the second side each have from 40 to 100 warp yarns per inch.

9. The self-retracting lifeline of claim 8, wherein the weft yarns in the first side and second side have a denier of from 1200 d to 2000 d, and the first side and the second side each have from 6 to 18 weft yarns per inch (ppi).

10. The self-retracting lifeline of claim 1, wherein the stuffer yarns have a denier of from 800 d to 2000 d and a filament count of from 500 to 1500, and the stuffer yarns are provided in a range of from 100 to 250 ends per inch.

11. The self-retracting lifeline of claim 1, wherein the ratio of the combined weight of the first side and the second side to the weight of stuffer yarns ranges from 1:2 to 2:1.

12. The self-retracting lifeline of claim 1, wherein the ratio of the combined weight of the first side and the second side to the weight of stuffer yarns ranges from 1:1.5 to 1.5:1.

13. The self-retracting lifeline of claim 1, wherein the stuffer yarns consist of high-tenacity aramid fibers having a tensile strength of 3.0 GPa or greater.

14. A self-retracting lifeline having leading edge capabilities, the self-retracting lifeline comprising:
 a webbing comprising:
  (a) a double cloth construction having (i) a first side having a plurality of warp yarns and weft yarns woven together, wherein the warp yarns are multifilament yarns comprised of ultra-high molecular weight polyethylene fibers; (ii) a second side having a plurality of warp yarns and weft yarns woven together, wherein the warp yarns are multifilament yarns comprised of ultra-high molecular weight polyethylene fibers; and (iii) a plurality of binder yarns extending between the first side and second side, whereby the binder yarns joins the first and second side together; and
  (b) a plurality of stuffer yarns positioned between the first side and second side of the double cloth and extending in the warp direction, wherein the stuffer yarns are cords consisting of para-aramid fibers having a tensile strength of 2.0 GPa or greater, wherein multiple stuffer yarns are formed into plied yarns, and multiple plied yarns are twisted together to form the cords;
 wherein the self-retracting lifeline meets or exceeds ANSI Standard Z359.14.

15. The self-retracting lifeline of claim 14, wherein three stuffer yarns are plied together to create a 3-ply yarn, and four of the 3-ply yarns are twisted together to form the cord.

16. The self-retracting lifeline of claim 15, wherein the stuffer yarns are selected from the group consisting of para-aramid fibers having a tensile strength of 3.0 GPa or greater.

17. The self-retracting lifeline claim 14, wherein the stuffer yarns comprise 10 to 20 cords.

18. The self-retracting lifeline of claim 14, wherein the stuffer yarns are provided in a range of 100 to 250 yarns per inch.

19. The self-retracting lifeline of claim 14, wherein the weft yarns in the first side and second side are comprised of multifilament ultra-high molecular weight polyethylene fibers.

20. The self-retracting lifeline of claim 14, wherein the first side has a first edge and a second edge and the second side has first edge and a second edge, and the weft yarns are continuously wrapped from the first side to the second side, thereby joining the (i) first edge of the first side to the first edge of the second side, and (ii) the second edge of the first side to the second edge of the second side.

* * * * *